Patented Aug. 18, 1942

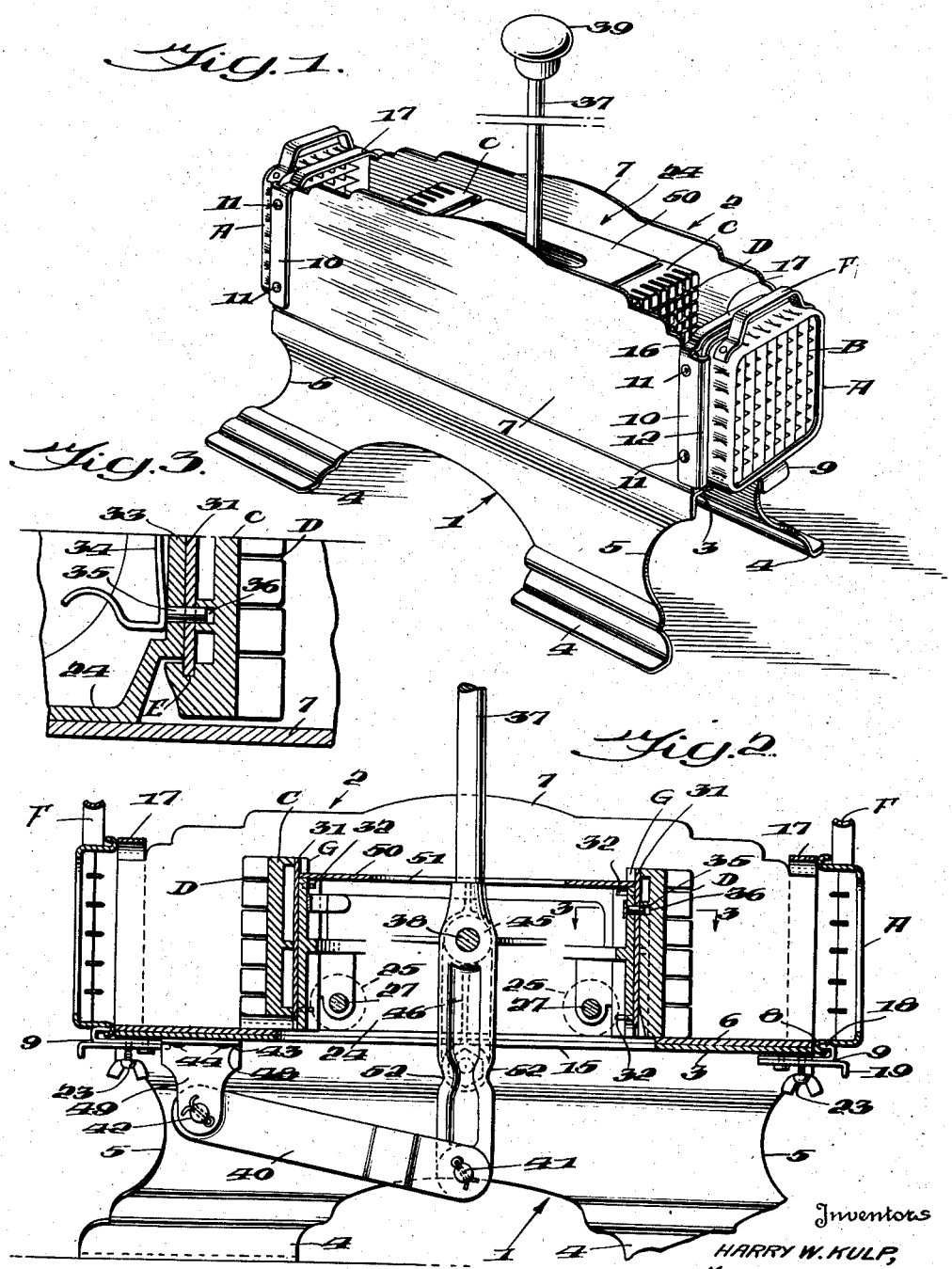

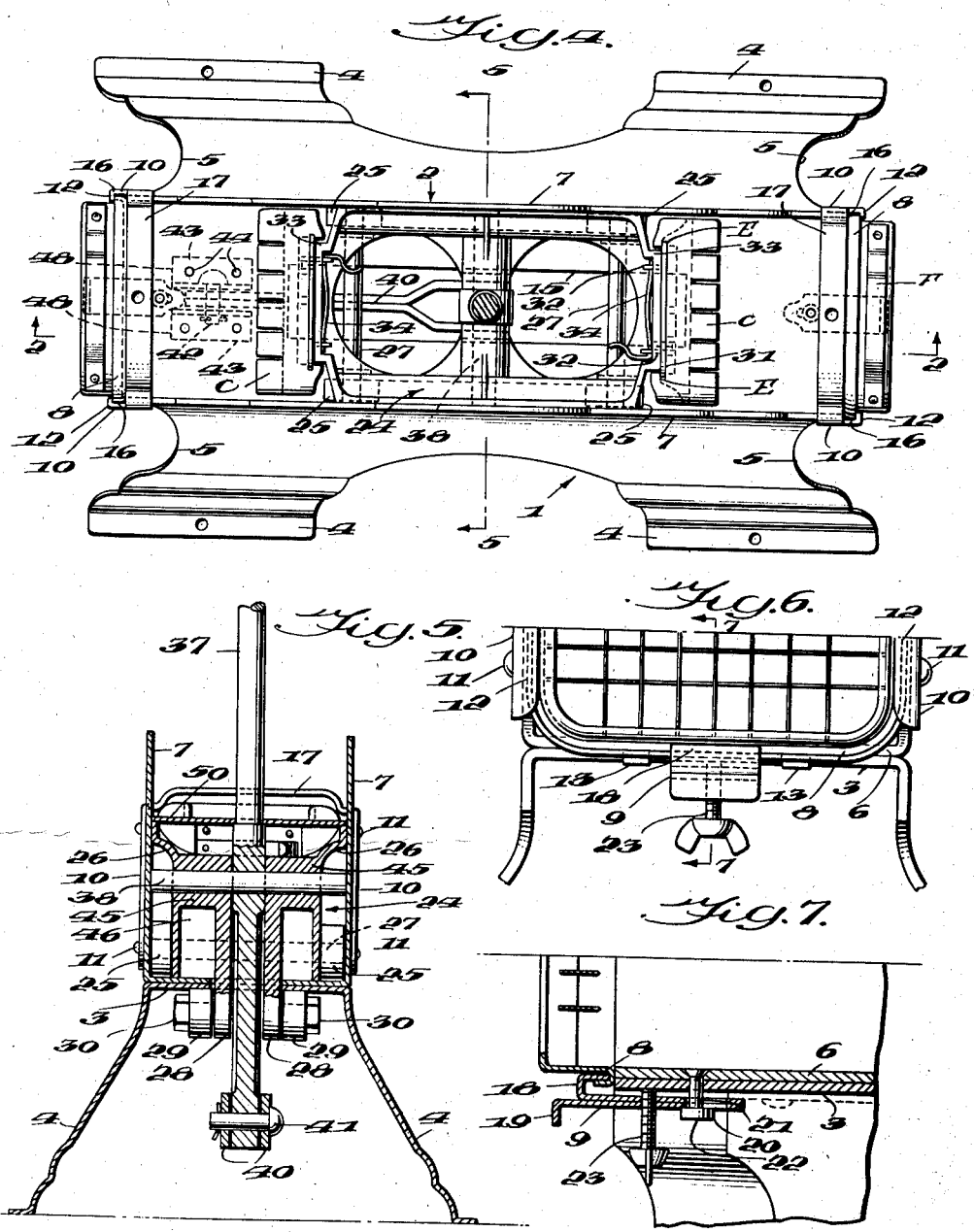

2,293,345

UNITED STATES PATENT OFFICE 2,293,345

FOOD CHOPPER

Harry W. Kulp and Martin C. Dellinger, Lancaster, Pa., assignors to K-D Manufacturing Company, a corporation of Pennsylvania Application January 10, 1940, Serial No. 313,288

6 Claims. (Cl. 146—169)

This invention relates to food choppers particularly adapted for slicing or chopping potatoes and other vegetables, though it may also be used for chopping or cubing meat or other foods or materials.

Some of the more general objects of the invention are: to provide a double acting food chopper particularly adapted for use in hotels, restaurants, and other places where it is necessary to operate on large amounts of food; to provide such a chopper which may be cheaply manufactured and assembled, and which may be manufactured in large part by sheet metal stamping operations; to provide in such a chopper a novel form of reciprocating carriage; and to provide stop means for limiting the reciprocating movement of said carriage.

Other more specific objects are: to provide such a chopper in which the entire frame may be formed of two sheet metal stampings; to provide novel means of assembling and positioning the roller bearing axles and pivot pin disposed in the carriage; and to provide novel locking and positioning means for the cutter elements.

In the accompanying drawings:

Figure 1 represents a perspective view of the preferred embodiment of the invention;

Figure 2, a section along the line 2—2 of Figure 4, looking in the direction of the arrows;

Figure 3, an enlarged fragmentary section along the line 3—3 of Figure 2, showing the preferred mounting means for the presser blocks;

Figure 4, a top plan view of the preferred embodiment of the invention with the cover plate removed from the reciprocating carriage;

Figure 5, a section along the line 5—5 of Figure 4, looking in the direction of the arrows;

Figure 6, a detail enlarged end elevation of the invention; and,

Figure 7, a section along the line 7—7 of Figure 6, looking in the direction of the arrows.

Broadly speaking, the food chopper of our invention comprises a frame consisting of a trough member mounted on a supporting base and having cutter elements disposed at its ends, a carriage mounted for reciprocation in said trough and carrying presser blocks at its ends, and means for reciprocating said carriage to alternately move said presser blocks towards their respective adjacent cutter elements.

Referring now in detail to the drawings, the chopper frame preferably consists of a sheet metal or other suitable material channeled member or trough 2 mounted on and supported by a sheet metal or other suitable material base 1.

As clearly shown in the drawings, the trough or channeled member 2 consists of a flat rectangular horizontal plate 6 and parallel vertically disposed sides or side walls 7 integral with said plate.

The base 1 is preferably formed with a flat horizontal top plate 3 and integral downwardly bent supporting legs 4, and in the preferred form of the invention each of the legs 4 is formed with a cut-out portion 5 to permit the rim or edge of a bowl or other receptacle to be conveniently placed beneath each end of the chopper.

In the assembled condition of the frame the plate 6 of trough 2 is permanently rigidly secured in any suitable manner, as by spot welding or riveting, to plate 3 of the base 1, it being noted that this preferred form of construction serves to provide a very strong rigid double bottom, consisting of the two plates 3 and 6, for trough or channeled member 2. The double bottom thus formed is provided with a longitudinally extending slot 15 for reasons hereinafter set forth.

Mounted at opposite ends of channeled member or trough 2 are a pair of cutter elements A, each provided with two series of knives B disposed at right angles to each other, said elements A preferably being similar to the cutter elements shown and described in detail in the Dellinger Patent 1,867,657, July 19, 1932, and differing from the disclosure in said patent in that the marginally disposed beading or curl 8 of each said cutter element instead of being entirely closed or of rounded cross-section as shown in said patent, is partly open or of substantially U-shaped cross-section to cooperate with the hereinafter more fully described locking means or lock 9, all as clearly shown in Figure 2 of the drawings.

In a food chopper or machine such as disclosed herein it is highly desirable, though not absolutely essential, that the cutter elements A should be easily and quickly removable for cleaning or replacement and, in addition, in the assembled operative condition of the device said elements A must be firmly rigidly maintained in position against displacement so that the knives or blades B thereof will at all times be maintained in registry with the slots D in their respective cooperating presser blocks C, and cannot be displaced upwardly when operating on potatoes or other articles which may become vertically slantingly disposed between said respective elements A and blocks C.

To this end, the preferred mounting and positioning means for each said cutter element A comprises a pair of parallel vertical guide and retaining slots 16 formed at each end of trough 2 to slidably receive the side marginal beadings 8 of cutter elements A, thereby preventing lateral movement thereof.

In the preferred embodiment of the invention shown in the drawings the slots 16 are formed by sheet metal or other suitable material members 10 attached to the outer longitudinal face adjacent the ends of each side wall 7 of trough 2 by rivets 11 or other suitable means, each said member 10 projecting longitudinally beyond the adjacent vertical end edge of its respective side wall 7 and having an inwardly disposed transversely extending portion or flange 12 spaced away from and parallel to the vertical end edge of its respective side wall.

Preferably the upper ends of said opposed members 10 at each end of trough 2 are connected by an integral tie rod 17, this construction serving to brace and maintain the trough side walls 7 in their spaced parallel relationship.

In order to securely strongly maintain cutter elements A in proper vertical position suitable means are provided at each end of the chopper to cooperate with said cutter elements A.

Each said means comprises suitable stop means, such as the lugs or stops 13 integral with the trough bottom plate 3 and extending longitudinally into the path of downward sliding movement of the lower edge beading 8 of its respective cutter element A to limit the downward movement of said element, and a lock or locking element 9 adapted to engage said lower edge beading 8 and firmly maintain the same in engagement with said stops 13.

The preferred form of lock or latch 9 shown in the drawings consists of a pair of integrally connected members the upper of which is formed with an upwardly and reversely bent hook portion or hook 18 adapted to move longitudinally into and out of engagement in the U-shaped lower edge beading 8 of its respective cutter element A; and the lower of which extends longitudinally outward beyond said hook 18 and if desired may be formed with a downwardly turned lip to form a convenient handle 19 for manipulating lock 9.

Each lock is longitudinally slidably mounted on the bottom of trough 2 by suitable means such as the rivet or stud 20 passing through a longitudinally disposed slot 21 formed in said lock and fixedly attached to the bottom of trough 2 as shown. The head 22 of each said stud is wider than slot 21 and slidably engages the lower face of lock 9 on each side of slot 21.

In combination with each lock 9 there is provided means such as a thumb screw or set screw 23 passing therethrough at its medial portion to, when screwed into tight engagement with the bottom plate 3 of trough 2, press said lock 9 downwardly to firmly maintain the cutter element A in engagement with its respective cooperating stops 13, and additionally to prevent longitudinal movement of lock 9 when said set screw 23 is in tight engagement with said trough bottom.

When it is desired to remove cutter elements A for cleaning or other purposes, it may be seen that after releasing the locks 9 from engagement in the beadings 8 of their respective cutter elements A, both of said elements A may then be lifted vertically upward out of engagement in their respective guide slots 16, and in order to facilitate said removal operation it may be desirable to provide each of said cutter elements A with a suitable handle F.

Mounted for longitudinal reciprocation in the trough or channeled member 2 is the presser block carriage 24 of the invention formed with an opening extending therethrough from top to bottom. In the embodiment of the invention shown in the drawings carriage 24 is formed by suitable die casting operations, although it may be formed in other ways.

Preferably the bottom portion of carriage 24 is substantially narrower than trough 2 and spaced away from the side walls 7 thereof to provide room for upper roller bearings 25, while the upper side portions of said carriage 24 are outwardly flared as at 26 into free sliding engagement with said side walls 7 to prevent the food or other material operated upon from falling downward between said side walls 7 and carriage 24 onto upper roller bearings 25.

Disposed preferably adjacent each end of carriage 24 is a transversely extending bearing axle or pin 27 having its ends passing through and journalled in the opposed lower side walls of said carriage 24 and extending into free sliding engagement with the respective side walls 7 of channeled member or trough 2, whereby endwise movement of said axles or pins 27 is prevented.

The upper roller bearings 25 are preferably disposed or journalled for rotation at each end of the axles 27, the position of said axles 27 and diameter of bearings 25 being such that said bearings engage and roll in a longitudinal direction along the upper face of the trough bottom during reciprocation of the carriage 24, thereby supporting the lower face of carriage 24 just clear of said bottom to reduce friction during operation of the chopper.

In order to prevent carriage 24 from being lifted or from riding up out of the trough 2 during operation said carriage is provided preferably at its central portion with a pair of laterally spaced preferably integral feet 28 depending downwardly through slot 15 of the trough bottom. Each of said feet 28 carries at its lower end a freely rotatably mounted lower roller bearing 29 in operative engagement with the lower face 3 of the trough bottom.

The preferred mounting means for each said lower roller bearing 29 consists of a bolt 30 screwed into the laterally outer face of its respective foot 28 and having its respective roller bearing 29 mounted thereon between said foot 28 and the head 30 of said bolt. Preferably each said bolt 30 is formed with a smooth cylindrical bearing surface to receive its bearing 29.

A pair of presser blocks C are mounted at the respective opposed ends of carriage 24 to, during reciprocation of carriage 24, be alternately carried into and out of operative engagement with the respective adjacent cutter elements A, thereby forcing food or other material therethrough. Preferably presser blocks C are each formed with two series of slots D at right angles to each other, said slots D being in registry with and adapted to receive the cutter blades B of their respective cooperating cutter elements A; and preferably each said presser block C is constructed as disclosed in Dellinger Patent 1,947,153 for Food choppers, Feb. 13, 1934, so that it may be slidably removably applied to carriage 24 and locked in place thereon.

According to this construction, each presser block C is formed on its back shoulders G respectively with laterally opposed grooves E to slidably receive the laterally opposed vertical edges of its respective tie plate 31, one of said tie plates 31 being fixedly mounted at each end of carriage 24 by suitable means such as rivets or pins 32.

It is to be noted that, in the preferred embodiment of the invention, each end of the carriage 24 is formed with an integral relatively narrow longitudinally projecting abutment 33 on which is mounted the tie plate 31, the opposed edges of said tie plate 31 projecting laterally beyond the side edges of said abutments 33 but being of substantially less width than the trough 2 so as to leave room for the grooved shoulders G of presser blocks C to extend between the trough side walls 7 and said laterally opposed tie plate edges.

The preferred means for locking each presser block C in position on its respective end of carriage 24 comprises a leaf spring 34 fixedly attached at one end to its respective inner end face of carriage 24 and carrying at its free end a locking pin 35 removably extending through the end abutment 33 and plate 31 to be received in a socket 36 formed in the back of presser block C. The operation and construction of said locking means is substantially the same as set forth in the aforementioned Dellinger Patent 1,947,153.

In the preferred construction and arrangement of presser blocks C, tie plates 31, and locking means 35, hereinbefore described, the presser blocks may be easily removed for cleaning or for substitution of new parts etc. simply by retracting the locking pins 35 from sockets 36 in their respective presser blocks C and sliding said blocks vertically upwardly, however this preferred construction and arrangement is not essential to my invention and it is to be understood that the presser blocks C or equivalent pressing means may be applied to the ends of carriage 24 in various ways, and it is not essential that said blocks C be removably mounted.

The operating means of the invention for producing reciprocation of the presser block carriage 24 preferably comprises an operating lever 37 passing down through the central portion of carriage 24 and medially pivotally connected thereto by transversely disposed pivot pin 38 for swinging or oscillating movement in a vertical longitudinal plane. At the upper end of lever 37 it is desirable to provide an operating knob or handle 39 by which said lever may be comfortably grasped and operated. The lower end of the lever 37 is fulcrumed to one end of a connecting link 40 by means of pivot pin 41, the other end of said connecting link 40 being pivotally connected by means of pivot pin 42 to a fixed or stationary member such as bracket 43 attached to the bottom of trough 2 by rivets 44.

In the preferred form of the invention the pivot pin 38 is journalled in trunnions 45 integral with, and having their bores extending on through the sides of carriage 24. Said pin 38 is of substantially the same width as trough 2 so that, as in the case of the roller bearing axles 27, its opposite ends slidably engage the trough side walls 7 and are thereby held in position against axial displacement.

Preferably the trunnions 45 are integral with the respective upper end portions of the feet 28 and serve as supporting and bracing means for said feet, and, if desired, additional bracing means in the form of transversely extending vertical webs 46 integrally connected to said respective trunnions 45 and feet 28 may be provided.

It may be seen that in this arrangement the operating lever 37 is pivoted for swinging movement between the laterally spaced feet 28.

In the preferred embodiment of the invention the bracket 43 comprises a pair of similarly shaped sheet metal bracket members permanently fastened at their bases 48 to the bottom of trough 2 so that their vertical portions 49 are disposed in laterally spaced relationship to receive between them the end of connecting link 40.

If desired, the connecting link 40 may also be conveniently formed from a pair of sheet metal members or stampings. Preferably at one end said members lie flush against each other to be received between the bracket members 43 as hereinbefore mentioned, and at the other end are offset away from each other to receive between them the lower end of lever 37, all as shown clearly in Figures 4 and 5 of the drawings.

In order to provide an attractive finished appearance for the food chopper and prevent food from being dropped through the opening in carriage 24 it is desirable to provide a cover such as the preferably chromium plated sheet metal plate 50 loosely mounted or laid on top of carriage 24 with its end and side edges respectively loosely engaging and being positioned by trough side walls 7 and the grooved shoulders G of presser blocks C. Plate 50 is of course formed with a longitudinally extending slot 51 to permit swinging movement of lever 37 which passes therethrough.

In the operation of the chopper the lever 37 is first swung to move carriage 24 to one end, for instance the left end, of trough 2, whereupon the food or vegetables, such as potatoes, which are to be operated upon, may be placed in the right hand end of trough 2 between the then widely spaced presser block C and cutter element A of that end. Then the upper end or knob 39 of lever 37 may be grasped and swung or shoved toward the right, moving the right hand presser block C toward the right into operative engagement with cutter element A to force the food or other material being operated upon through said right hand cutter element A.

When the carriage 24 has thus been moved to the extreme right, potatoes or other vegetables may then be placed in the left hand end of the trough 2 and the process reversed, this being repeated again and again so that repeated oscillations or swinging movements of lever 37 cause alternate chopping or cubing of material at opposite ends of the chopper.

It is to be noted that during swinging movement of the lever 37 in operation of the chopper the lower end of said lever 37 is maintained in substantially fixed position longitudinally by connecting link 40 although said link swings up and down about pivot pin 42 during swinging movement of lever 37 to permit the necessary up and down movement of the lower end of lever 37. In order to permit the necessary degree of swinging movement of lever 37 it may be desirable to form preferably rounded depressions on opposite sides of said lever 37 to permit clearance between said lever 37 and the axles 27.

It is further to be noted that during reciprocation of the carriage 24 the downwardly depending feet 28 of the carriage contact the ends of slot 15 at the farthest points of movement of carriage 24 towards either end of trough 2, thereby acting as stop means to prevent the bottoms of presser block slots D from being forced into engagement with and dulling the edges of cutter element blades B.

We claim:

1. A food chopper comprising a base; a trough mounted on said base, said trough comprising a rectangular longitudinally slotted bottom, and parallel vertically disposed sides, said sides being formed at each end of said trough with vertically extending parallel opposed slots; a pair of cutter elements respectively mounted in said slots at opposite ends of said trough; means mounted on said trough for locking said cutter elements in position in said slots; a carriage mounted for reciprocation in said trough and being formed with an opening extending vertically therethrough; presser blocks respectively disposed at opposite ends of said carriage to alternately operatively move into engagement with their respective adjacent cutter elements during reciprocation of said carriage; a pair of transversely extending axles respectively disposed at the opposite end portions of said carriage, and a transverse pivot pin medially disposed in said carriage, said axles and said pivot pin being mounted in and having their ends extending through the opposite sides of said carriage into free sliding engagement with the side walls of said trough, whereby said axles and said pivot pin are maintained in proper axial position; roller bearings freely rotatably mounted on said axles in operative engagement with the trough bottom to support said carriage clear thereof; a pair of feet mounted on said carriage and depending downwardly through said slotted trough bottom; roller bearings freely rotatably carried by said feet in operative engagement with the lower face of said trough bottom; and means for reciprocating said carriage comprising an operating lever mounted on said pivot pin for longitudinal swinging movement in a vertical plane with its lower end depending through the slotted bottom of said trough, and a substantially longitudinally immovably mounted vertically swingable link pivotally connected to the lower end of said lever.

2. A food chopper comprising a base; a trough mounted on said base, said trough comprising a longitudinally slotted bottom, and parallel vertically disposed sides; a pair of cutter elements respectively removably mounted at opposite ends of said trough; a carriage mounted for reciprocation in said trough; presser blocks removably carried at the opposed ends of said carriage to alternately operatively move into engagement with their respective adjacent cutter elements during reciprocation of said carriage; a pair of transversely extending axles respectively disposed at the opposite end portions of said carriage, and a transverse pivot pin medially disposed in said carriage, said axles and said pivot pin being mounted in and having their ends extending through the opposite sides of said carriage into free sliding engagement with the side walls of said trough, whereby said axles and said pivot pin are maintained in proper axial position in said carriage; roller bearings freely rotatably mounted on said axles in operative engagement with the trough bottom to support said carriage clear thereof; a pair of feet mounted on said carriage and depending downwardly through said slotted trough bottom; roller bearings freely rotatably carried by said feet in operative engagement with the lower face of said trough bottom; and means for reciprocating said carriage comprising an operating lever mounted on said pivot pin for longitudinal swinging movement in a vertical plane with its lower end depending through the slotted bottom of said trough, and a substantially longitudinally immovably mounted vertically swingable link pivotally connected to the lower end of said lever.

3. A food chopper comprising a base, a trough mounted on said base, a pair of cutter elements respectively removably mounted at opposite ends of said trough, a carriage mounted for reciprocation in said trough, presser blocks removably carried at the opposed ends of said carriage to alternately move into operative engagement with their respective adjacent cutter elements during reciprocation of said carriage, a pair of transversely extending axles respectively disposed at the opposite end portions of said carriage, said axles being mounted in and having their ends extending through the opposite sides of said carriage into free sliding engagement with the side walls of said trough, whereby said axles are maintained in proper axial position in said carriage, roller bearings freely rotatably mounted on axles in operative engagement with the trough bottom to support said carriage clear thereof; feet mounted on said carriage and depending downwardly through said slotted trough bottom, roller bearings rotatably carried by said feet in operative engagement with the lower face of said trough bottom; and means for reciprocating said carriage comprising an operating lever pivotally mounted on said carriage for longitudinal swinging movement in a vertical plane with its lower end depending through the bottom of said trough, and a substantially longitudinally immovably mounted vertically swingable link pivotally connected to the lower end of said lever.

4. A food chopper comprising a base, a trough mounted on said base, a pair of cutter elements respectively mounted at opposite ends of said trough, a carriage mounted for reciprocation in said trough, presser blocks carried at the opposite ends of said carriage to alternately move into operative engagement with their respective adjacent cutter elements during reciprocation of said carriage, roller bearings carried by said carriage in operative engagement with the respective upper and lower faces of the trough bottom to support said carriage at a fixed level clear of said trough bottom, and means for reciprocating said carriage comprising an operating lever pivotally mounted on said carriage for longitudinal swinging movement in a vertical plane with its lower end depending through the slotted bottom of said trough, and a substantially longitudinally immovably mounted vertically swingable link pivotally connected to the lower end of said lever.

5. A food chopper comprising a sheet metal base formed with a horizontal rectangular plate and integral downwardly depending supporting legs attached to the edges of said plate; and a trough mounted on said base, said trough comprising a horizontal rectangular bottom plate permanently attached in registering relation to the horizontal plate of said base to form a strong double thickness bottom for said trough, and vertical parallel longitudinally extending side walls integrally attached to the opposed side edges of said bottom plate; in combination with a carriage mounted for reciprocation in said trough, transversely disposed axles journalled in the sides of said carriage and having their opposed ends in free sliding engagement with the trough side walls to be retained in axial position thereby, and roller bearings freely rotatably journalled on said axles.

6. A food chopper comprising a trough formed with a longitudinally extending slot in its bottom, longitudinally spaced cutter elements mounted in said trough, a carriage mounted in said trough for longitudinal reciprocation between said cutter elements, means carried by said carriage for forcing food through said cutter elements during reciprocation of said carriage, said carriage being formed with an opening therethrough in registry with said slot, transversely spaced roller supporting feet secured to said carriage and depending downwardly through said slot, rollers carried by said feet in operative rolling engagement with the lower face of the trough bottom to maintain the carriage in close proximity to the trough bottom during reciprocation thereof, an operating lever disposed through and medially pivotally secured in said opening in the carriage for longitudinal swinging movement between said transversely spaced feet, and means for pivotally securing the lower end of said lever against longitudinal displacement while permitting vertical movement thereof.

HARRY W. KULP.
MARTIN C. DELLINGER.